United States Patent Office 3,567,431
Patented Mar. 2, 1971

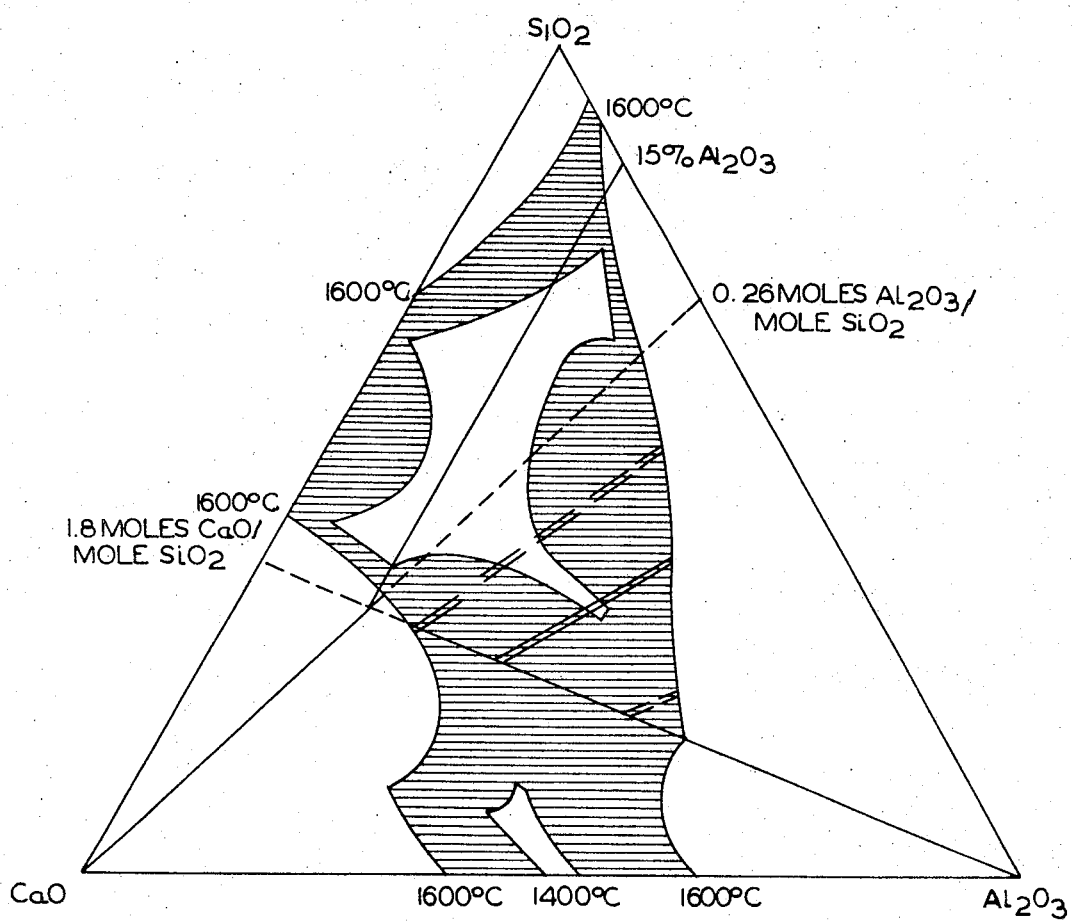

3,567,431
PRODUCTION OF MAGNESIUM IN SLAG OF RESTRICTED CaO CONTENT
Walther Schmidt, Richmond, Va., assignor to Reynolds Metals Company, Richmond, Va.
Filed July 5, 1967, Ser. No. 651,216
Int. Cl. C22b 45/00
U.S. Cl. 75—67     2 Claims

ABSTRACT OF THE DISCLOSURE

Magnesium oxide and calcium oxide, in respective molar proportions varying from 4:1 to 8:1, are fed into an electric furnace into which a metallic silicon-containing reductant, having approximately equal contents by weight of Si and Al and also containing iron and titanium, is fed in matched proportion to the CaO in order to maintain a liquid slag bath having CaO and $SiO_2$ in respective molar ratios varying from about 0.5:1.0 to about 1.2:1.0, whereby the weight of slag which is produced is approximately twice the weight of magnesium metal product.

---

This application relates to a method for reducing magnesia-bearing ores by a metallic silicon-containing reductant in a liquid slag melting at below about 1600° C. The slag contains no more than about 1.5 moles of CaO per mole of $SiO_2$ and advantageously also contains $Al_2O_3$.

Reduction processes for use upon magnesium oxide materials to yield metallic magnesium have evolved along two general lines: those in which retorts are used, which are externally heated, e.g., the so-called Pidgeon process and those which are heated from within the reaction vessel itself. The present invention deals with the latter kind of processes, in which a metallic reductant like aluminum or more generally silicon or both combined are used. The necessary heat is usually supplied by electric resistance heating in which an electric current is passed through the feedstock mixture of materials and usually also through the resulting liquid slag and metallic by-product. Calcined dolomite is the favored ore for such processes and usually carbon electrodes are employed because few other electrode materials can stand up to the high temperatures involved.

Such processes generally employ silicon as a reductant in the form of ferro-silicon (most commonly containing 70–99% Si) and operate upon dolomite according to the equation:

$$2(CaO \cdot MgO) + Si \rightarrow 2CaO + SiO_2 + 2Mg$$

This reaction takes place at a temperature usually above 1400° C., at which temperature magnesium metal is volatile. The rate of reaction is usually promoted by operating at a reduced pressure. Since magnesium is produced in closed equipment, so that air may be excluded, reduced pressure usually does not require extensive modification of the equipment. The vaporized magnesium is led to a cooler chamber where it is condensed and recovered, preferably in the liquid form. Such processes using a metallic reducing agent, as developed to date, appear to fall into two categories: those in which the magnesium is produced by a solid state reaction and those which take place in the liquid state, i.e., in which the MgO bearing raw material is dissolved within a fused slag bath. The main advantage of the solid state reactions is purported to be a more complete recovery of the magnesium values from the ore. A handicap is the production of a slag by-product which may be sticky or gummy and, therefore, difficult to remove from the reactor.

In a more recent approach, a fully liquid slag by-product is produced and the solid state reactants are floated on the top of this slag. It will be readily understood that this type of solid state reaction requires a very intimate mixing of the ore and reductant before introduction to the reactor, and the necessary fine grinding of the feed materials adds to the expense of the process. Moreover, fines are often entrained by the sometimes violent evolution of magnesium vapors and lead to contamination of the condensed product. The floating technique, further, requires a high degree of care in the furnace operation. It has been proposed to regulate the feed quantity in proportion to the quantity of the liquid and its heat content. Obviously, with each reacted batch, the quantity of the liquid slag increases and the quantity of every subsequent batch of feedstock would have to be changed. Orderly programming of such an operation is extremely difficult.

U.S. Pat. 2,971,833 purports to solve the problem of impurity formation by conducting the reaction in the liquid phase within a molten slag which contains a certain proportion of alumina, further alumina being added during the process, in order to maintain the desired minimum. It has been found, however, that the process described in this patent has a very small, practical operating range and that the addition of the large amount of alumina needed to provide the required minimum proportion of alumina in the slag is expensive to buy, prepare for use and heat to reaction temperature and further creates unduly large amounts of slag.

It has now been found that the benefits attributed in the above-mentioned patent to the presence of alumina may be obtained by operating the magnesium reduction furnace with less CaO in the liquid slag than is prescribed in the aforesaid patent, with or without the presence of significant amounts of alumina in the liquid slag. In this invention, when alumina is desired in the slag, it is preferably provided by the addition of a certain intermetallic aluminum complex.

It has now surprisingly been found that the thermochemical requirements to suppress the harmful side reactions are fully satisfied if the CaO content of the slag is matched with as much as $SiO_2$ as to satisfy compositions substantially ranging between the compounds $3\ CaO \cdot 2\ SiO_2$ and $CaO \cdot SiO_2$, i.e., having a molar ratio of $$\frac{CaO}{SiO_2} = 1.5\ \text{to}\ 1.$$

The melting point of $3\ CaO \cdot 2\ SiO_2$ is approximately 1700° C. and that of $CaO \cdot SiO_2$ is 1544° C. Between the two compounds are eutectics melting at approximately 1460° C.

Processes which use ferrosilicon or ferrosilico-aluminum as reductants must be operated at a temperature permitting the liquid discharge of the residual iron-containing metallic phase which accumulates at the bottom. This necessitates a minimum operational temperature of 1450° C., a more practical temperature being 1500° C. Of course, the slag supernatant to the metal heel must have a correspondingly low melting point.

The eutectic between $3\ CaO \cdot 2\ Sio_2$ and $CaO \cdot SiO_2$ offers a convenient way to work around 1500° C., even with no alumina added. Evidently, if $Al_2O_3$ is added, it would not contribute to the chemistry but add to fluidity if so desired. In this invention, when alumina is desired in the slag, it is preferably provided by the addition of a certain intermetallic aluminum complex.

This invention will be better understood by reference to the accompanying drawing, which is a simplified phase diagram of the ternary system CaO, SiO₂, Al₂O₃ which represents all possible proportions of the three oxides in a slag. On this diagram, the 1600° C. isotherm and the 1400° C. isotherm have been sketched. The shaded portion of the diagram represents mixtures which are molten at a temperature between about 1400° C. and 1600° C., the white spaces within the shaded area representing mixtures of the oxides which are molten at below 1400° C.

On this phase diagram have been drawn lines which represent the lower limits of components specified in the abovementioned patent; those slag compositions which meet the requirement of the patent are, therefore, wholly included within the lower triangle of this diagram bounded by solid lines. Since the process of the cited patent prefers an operating temperature of around 1500° C., its preferred operation is within the 1600° C. isotherm, that is, within that limited shaded area of the lower triangle, or within its enclosed white space. It is readily seen that to obtain operations near the temperature preferred in the above-mentioned patent considerable alumina, at least about 20%, needs to be added to the slag and, as mentioned, this requires not only the transportation of alumina to the refinery, but considerable costs are involved in calcining this much alumina before addition to the slag and in melting the heavy slag burden.

It has been discovered that CaO present in the slag also is a burden which does not contribute to the chemistry of the process and adds greatly to heating costs. It has further been found that by operating at a CaO ratio in the slag below the proportion stated in the above-mentioned patent, a much greater range of preferred operating conditions is presented and no significant amount of alumina need be present in the slag to obtain the benefits set out in the aforesaid patent. In this invention, magnesium oxide materials are reduced with a metallic silicon-containing reducing agent in a liquid slag mixture having a melting point less than about 1600° C., consisting essentially of silica and less than about 1.5 moles CaO per mole of silica.

When dolomite is to be employed as the ore from which the magnesium is to be extracted, the liquid slag may be prepared by melting a mixture of SiO₂ and CaO of such proportions as to melt below about 1600° C., for example, a mixture having about 50% silica by weight. As dolomite is added to this molten slag, along with a metallic silicon reducing agent, according to the equation above, two moles of calcium oxide accumulate for each mole of silicon and the proportion of calcium oxide increases faster than the proportion of silica; thus, the proportions of the accumulated slag will eventually pass outside the 1600° C. isotherm, requiring addition of SiO₂ along with the dolomite feed.

It has been found that considerably less weight of slag per weight of magnesium produced can be used if the feed stock is enriched in MgO as compared with dolomite.

Surprisingly, the formation of the harmful substances SiO and CO can be effectively suppressed if a much higher MgO concentration is used on which the Si-containing reductant acts. Sources of MgO may be magnesite or MgO derived from sea water or brines, as is known in the art. Of course, MgO suitable for this process must be fully calcined.

According to the proportion of MgO and CaO in the feed, less or even no SiO₂ additive is required and the process can rely on the SiO₂ derived from the reduction itself, being formed in situ from the silicon-containing reductant. Preferred feedstocks have no more than 1 mol equivalent of CaO for 2 mol equivalents of MgO and, for optimum results, 1 mol equivalent of CaO for 6–10 mol equivalents of MgO. Within the frame of this invention, the ratio of mol CaO:mol MgO of the feed is limited only by the amount of SiO₂ resulting from the reduction and the mol ratio $$\frac{CaO}{SiO_2} = \text{about } 0.4 \text{ to } 1.5$$

This ratio may, e.g., be provided by mixing calcined dolomite with calcined magnesite. The resulting slag has considerably less weight and volume than with the use of dolomite alone.

The slag preferably contains about 10–40% Al₂O₃ or more and this condition is advantageously brought about by the use of metallic aluminum conjointly with silicon as the reducing agent. Aluminum reacts, for example, with dolomite in the electric furnace, according to the equation $$3\ (CaO \cdot MgO) + 2Al \rightarrow 3\ CaO + Al_2O_3 + 3\ Mg$$

Metallic aluminum for use in the process in this invention is preferably that which is contained in a waste product obtained in smelting alumina-silica mixtures with carbon to obtain Al-Si alloys. The process described in U.S. Pat. 3,254,988 produces as a waste product an intermetallic complex of aluminum and silicon which contains iron and often titanium as well. Such a product generally contains approximately 80% in form of intermetallic complexes while the rest is uncombined aluminum and silicon. The formula for the fully satisfied intermetallic compound of iron is FeAl₃Si₂, with most of the titanium present as TiSi₂. Some of the iron in FeAl₃Si₂ may be replaced by titanium. Such a waste product may contain approximately:

|  | Parts |
| --- | --- |
| Aluminum | 35–45 |
| Silicon | 34–45 |
| Iron | 10–20 |
| Titanium | 2–20 |

While the commonly used ferrosilicon with 75–80% Si has a melting point of 1350–1380° C., all constituents of the Al-Si-Fe-Ti waste product other than TiSi₂ have a melting point below 1000° C. This reductant also has a smaller latent heat of fusion than ferrosilicon. For these reasons, the reductant is faster liquified within the slag bath. Neglecting impurities, a typical batch of such waste product contains about 35% aluminum, 37% silicon, 20% iron, and 8% titanium. In the reaction with MgO, the chemically combined Si will only react until the compounds FeSi and TiSi are formed. Also, there is an efficiency loss on aluminum. Therefore, if this product is employed as the sole source of metallic reducing agent in the process, it can be assumed that 15 of the parts of silicon and 7 parts of the aluminum will not react with the magnesium oxide feedstock. Of the reacting metals, the 22 parts of silicon will produce 47 parts SiO₂ while the 28 parts of aluminum will produce 53 parts of Al₂O₃. The ratio of oxides resulting in the slag from the use of this particular intermetallic waste product is shown in the drawing by a double line. However, it will be readily observed that this ratio is not critical. Since this intermetallic waste product is known to vary in its composition from time to time, the preferred composition of this waste product, set out in terms of silica-alumina oxide ratios resulting from its use in the process, is indicated by the double dashed lines appearing in the drawing. Thus, those intermetallic compounds are preferably used which have proportions of reactive silicon and aluminum such as to result in a ratio of SiO₂/Al₂O₃ between 30/70 and 70/30, the CaO content of the slag being less than about 1.5 CaO/mole silica and sufficient to give a slag melting at below 1600° C.

With reference to the desirability of tying up all or most of the SiO₂ in form of a chemical compound having a definite heat of formation and, therefore, suppressing the harmful side reactions, it has been found that a preferred compound is CaO·Al₂O₃·2SiO (Anorthite) having a melting point of 1553° C., though it is not critical to deviate from this theoretical composition within certain ranges. Obviously, the use of more CaO and/or Al₂O₃ within the molecular limits of this invention will be beneficial by further diluting the SiO₂ in the slag. But also, one may allow more SiO₂ than in Anorthite, within limits extending in the diagram from the position of $$CaO \cdot Al_2O_3 \cdot 2SiO_2$$

towards the 1600° C. isotherm on the right hand side of the diagram, not exceeding the ratio of approximately 75 SiO₂:25Al₂O₃ in weight. It will be shown that slags in the general range of Anorthite permit a substantially lower slag volume per ton Mg produced (Example IV).

The invention will be more readily understood by reference to the following examples which should be considered illustrative only and not limiting.

For the following examples, all oxides are taken in calcined condition. Dolomite, magnesite, and quartz are taken as substances of stoichiometrical composition. For the use of natural ores, the quantities of the examples must be adjusted according to their analysis. E.g., in Example I, if the natural dolomite is higher in CaO than the stoichiometric formula CaO·MgO, a corresponding amount of more quartz would be added in order to arrive at the desired slag composition.

All examples use an electric furnace with an upper electrode of graphite, being in contact with the fused slag which serves as resistor. The electric current is taken off the carbon bottom of the furnace. To start the furnace, a slag composition is fused together simulating the composition to be expected in continuous operation in which portions of the slag as well as the metallic heel accumulating at the bottom are tapped in intervals, leaving sufficient fused slag within the furnace to maintain the electrical contact.

In the example, the furnace is operated at a temperature sufficient to keep the slag well fluid, which normally will mean approximately 50–100° C. higher than its melting point. But in any case, the slag temperature is at least 1500° C. in order to prevent the metallic iron containing heel from freezing.

The furnace is fitted with a condenser, in which the Mg vapors are condensed, preferably to the liquid state.

The furnace is operated with a partial vacuum of approximately 20–30 mm./Hg.

The charge of oxides and of reductants are added in intermittent portions. They may be charged either together or separately.

EXAMPLE I

The reductant of this example is ferrosilicon containing approximately 80% Si. Of 80 parts Si in the ferrosilicon, approximately 70 parts Si are consumed by the process reaction leaving a heel comprising about ⅔ iron and ⅓ silicon. The slag composition in weight is approximately 54.8% CaO, 40.8% SiO₂, 4.4% MgO. 321 parts dolomite, 50 parts quartz, and 60 parts ferrosilicon are the charge materials. From this are produced approximately 72 parts Mg of commercial purity. The melting point of the slag is approximately 1600° C. The resulting slag is about 343 parts or 4.75 parts slag for 1 part Mg. The ratio in the slag of $$\frac{mol\ CaO}{mol\ SiO_2}$$

is 1.44.

EXAMPLE II

The reductant of this example is the same as in Example I. The slag composition in weight is approximately 45.1% CaO, 48.2% SiO₂, 6.7% MgO. Three mol equivalents of dolomite, i.e., 288 parts and 3 mol equivalents of magnesite=120 parts plus 25 parts MgO for efficiency loss, hence, 145 parts MgO and 120 parts of ferrosilicon are charged. From this are produced approximately 145 parts of magnesium of commercial purity. The melting point of the slag is approximately 1540° C.

The resulting slag is about 373 parts or 2.58 parts for 1 part Mg. The ratio in the slag of $$\frac{mol\ CaO}{mol\ SiO_2}$$

is approximately 1. The charged oxides have 1 mol equivalent of CaO for 2.2 mol equivalents of MgO.

EXAMPLE III

The reductant in the example is an alloy containing: 35% Al, 37% Si, 8% Ti and 20% Fe. In reducing MgO under the conditions of this example, the efficiency of the aluminum is approximately 80%, while the efficiency of the silicon is approximately 60%. This results in a metallic heel of nonconsumed metals melting approximately at 1400° C. The feedstock is in weight 86.5 parts dolomite and 108 parts magnesite, to which 100 parts of the reductant are added. The feed contains 50.4 parts CaO and 144 parts MgO or 0.9 mol equivalent CaO and 3.6 mol equivalents MgO, which is a ratio of $$\frac{mol\ MgO}{mol\ CaO}$$

equals 4. There are produced about 75 parts of magnesium of commercial purity. The amount of slag is approximately 170 parts or 2.26 parts for 1 part of Mg. Its composition is approximately 30% CaO, 31% Al₂O₃, 28% SiO₂, and 11% MgO. The ratio of $$\frac{mol\ CaO}{mol\ SiO_2}$$

is about 1.15. The melting point of the slag is approximately 1450° C.

EXAMPLE IV

In this example, it is aimed at a slag composition near to the compound: CaO·Al₂O₃·2SiO₂ (Anorthite), using the same reductant as in Example III. The feedstock is in weight 141 parts of magnesite and 25 parts of burned lime, taken as 100% CaO. This means that the feedstock contains about 1 mol equivalent of CaO for 8 mol equivalents of MgO. There are applied 100 parts reductant alloy and produced approximately 75 parts Mg. The amount of slag is approximately 141 parts having the approximate analysis: 33% SiO₂, 38% Al₂O₃, 18% CaO, and 11% MgO. The ratio of Mg to slag produced is approximately 1:1.9. The melting point of the slag is about 1500° C. The ratio of $$\frac{mol\ CaO}{mol\ SiO_2}$$

is approximately 0.57.

EXAMPLE V

It is assumed that no source of MgO other than dolomite is locally available, regarding cost of procurement. The reductant is the same alloy as in the Examples III and IV. It is aimed at a slag composition between the two compounds: CaO·SiO₂ and 3CaO·2SiO₂ with as much Al₂O₃ as will be formed in situ by the aluminum of the reductant. In weight, the feedstock is 332 parts dolomite and 113 parts quartz. There are produced with 100 parts of reductant approximately 75 parts of magnesium and 420 parts slag, analyzing approximately 12.6% Al₂O₃, 38.1% SiO₂, 46.2% CaO, and 3.1% MgO. The melting point of the slag is approximately 1400° C. The ratio of $$\frac{mol\ CaO}{mol\ SiO_2}$$

is approximately 1.3. The ratio of Mg and slag produced is 1:5.6. Obviously, this is a heavy burden as compared with the former examples. However, the low melting point of the slag and of the metal heel permits operation at only 1500° C.

What is claimed is:

1. In a process for producing magnesium by the reduction of a magnesia-containing substance with a metallic silicon-containing reducing agent in which the reaction is conducted within a liquid slag bath in an electric furnace having at least one carbon electrode submerged in the bath, whereby magnesium metal is produced and vaporized from the bath, the improvement which comprises utilizing a mixture of MgO and CaO and mixtures thereof, in combination, so that the molar ratio of MgO and CaO therein is maintained at from about 4:1 to about 8:1, and feeding said metallic silicon-containing reducing agent in the form of an intermetallic complex which contains about 35–45 parts aluminum, 35–45 parts silicon, 10–20 parts iron, and 2–20 parts titanium by weight, in matched proportion to said CaO so that said liquid slag bath melts about 1600° C. and said CaO and the $SiO_2$ formed in said reaction are present in said bath in respective molar ratios varying from about 0.5:1.0 to about 1.2:1.0, whereby the weight of slag which is produced is approximately twice the weight of magnesium which is produced.

2. In a process of claim 1 the improvement which comprises utilizing a mixture of MgO and MgO·CaO, in combination.

References Cited

UNITED STATES PATENTS

| | | | |
|---|---|---|---|
| 3,475,162 | 10/1969 | Rhodes et al. | 75—67 |
| 3,427,152 | 2/1969 | Eisenberg et al. | 75—67 |
| 3,441,402 | 4/1969 | Magee et al. | 75—67X |

HENRY W. TARRING II, Primary Examiner

U.S. Cl. X.R.

75—10

UNITED STATES PATENT OFFICE
CERTIFICATE OF CORRECTION

Patent No. 3,567,431            Dated March 2, 1971

Inventor(s) Walther Schmidt

It is certified that error appears in the above-identified patent and that said Letters Patent are hereby corrected as shown below:

Column 7, line 16 - after "bath melts" insert -- below --

Signed and sealed this 22nd day of June 1971.

(SEAL)
Attest:

EDWARD M. FLETCHER, JR.          WILLIAM E. SCHUYLER, JR.
Attesting Officer                 Commissioner of Patents